(12) United States Patent
Nie et al.

(10) Patent No.: US 8,650,332 B2
(45) Date of Patent: Feb. 11, 2014

(54) METHOD FOR SWITCHING WORKING MODE, USB DEVICE, AND HOST DEVICE

(75) Inventors: Zhenhui Nie, Shenzhen (CN); Yeqi Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 159 days.

(21) Appl. No.: 13/343,309

(22) Filed: Jan. 4, 2012

(65) Prior Publication Data

US 2012/0179845 A1 Jul. 12, 2012

(30) Foreign Application Priority Data

Jan. 6, 2011 (CN) .......................... 2011 1 0002180

(51) Int. Cl.
*G06F 3/00* (2006.01)
(52) U.S. Cl.
USPC ............................................................ 710/14
(58) Field of Classification Search
USPC ............................................................ 710/14
See application file for complete search history.

(56) References Cited

U.S. PATENT DOCUMENTS

| | | | |
|---|---|---|---|
| 6,345,319 B2 * | 2/2002 | Lin et al. ............................ | 710/8 |
| 2003/0046447 A1 * | 3/2003 | Kouperchliak et al. ....... | 709/321 |
| 2005/0038934 A1 | 2/2005 | Gotze et al. | |
| 2005/0162688 A1 | 7/2005 | Nakaoka et al. | |
| 2005/0257225 A1 | 11/2005 | Choi et al. | |
| 2007/0299650 A1 | 12/2007 | Tamayo et al. | |
| 2009/0296850 A1 | 12/2009 | Xu et al. | |
| 2010/0023649 A1 | 1/2010 | Choi et al. | |
| 2010/0287452 A1 | 11/2010 | Xu et al. | |

FOREIGN PATENT DOCUMENTS

| | | |
|---|---|---|
| CN | 101105778 A | 1/2008 |
| CN | 101431828 A | 5/2009 |
| CN | 101465777 A | 6/2009 |
| CN | 101477498 A | 7/2009 |
| CN | 101620538 A | 1/2010 |
| CN | 101833466 A | 9/2010 |
| EP | 1221652 A2 | 7/2002 |
| EP | 1898306 A1 | 3/2008 |
| WO | WO 03/012577 A2 | 2/2003 |
| WO | WO 2008/153330 A1 | 12/2008 |
| WO | WO 2009/113792 A1 | 9/2009 |

OTHER PUBLICATIONS

Extended European Search Report issued in corresponding European Patent Application No. 12150226.4, mailed Apr. 23, 2012.
Campaq et al., "Universal Serial Bus Specification" Revision 2.0, Apr. 27, 2000, XP-002317002.

(Continued)

*Primary Examiner* — Farley Abad
(74) *Attorney, Agent, or Firm* — Brinks Gilson & Lione

(57) ABSTRACT

The embodiments of the present invention provide a method for switching a working mode, a USB device, and a host device. The method for switching a working mode includes: determining, according to the osvc key value in the registry of a host device, that a driver for a second working mode is installed on the host device, after the USB device is connected to the host device; and switching the current working state of the USB device from a first working mode to the second working mode. In the embodiments of the present invention, neither special auxiliary program nor additional driver needs to be developed. Therefore, the solution is easy to implement and a problem of incompatibility will not occur.

4 Claims, 6 Drawing Sheets

(56) References Cited

OTHER PUBLICATIONS

SourceQuest, "Microsoft OS Descriptors" Oct. 18, 2004.
Zte, "Details for A/N Transmission Based on DFT-s-OFDM" Agenda Item 6.2.2.1. 3GPP TSG Ran WG1 Meeting #62. Madrid, Spain, Aug. 23-27, 2010. R1-104671.
LTE, "3$^{rd}$ Generation Partnership Project; Technical Specification Group Radio Access Network; Evolved Universal Terrestrial Radio Access (E-UTRA); Multiplexing and Channel Coding" (Release 9) 3GPP TS 36.212. V9.2.0, Jun. 2010.
Catt et al., "ACK/NAK Multiplexing Simulation Assumptions in Rel-10" TSG-RAN WG1 Meeting #61bis. Dresden, Germany, Jun. 28-Jul. 2, 2010. R1-104140.
ZTE, "Details for A/N Transmission Based on DFT-s-OFDM" Agenda Item 6.2.2.1, 3GPP TSG RAN WG1 Meeting #62. Madrid, Spain, Aug. 23-27, 2010. R1-104671.
LG Electronics, "Details on DFT-S-OFDM Format for CA PUCCH" Agenda Item 6.2.2.1, 3GPP TSG RAN WG1 #62. Madrid, Spain, Aug. 23-27, 2010. R1-104757.
Search Report issued in corresponding Chinese Patent Application No. 201110002180.3, mailed Mar. 28, 2012.
Office Action issued in commonly owned U.S. Appl. No. 13/620,066, mailed Dec. 10, 2012.
Microsoft, Microsoft OS Descriptors Overview, Nov. 19, 2012.
Microsoft, "Extended Properties OS Feature Descriptor Specification" Nov. 19, 2012.
Microsoft, "Extended Compat ID OS Feature Descriptor Specification" Nov. 19, 2012.
Notice of Allowance issued in commonly owned U.S. Appl. No. 13/620,066, mailed May 23, 2013.
Office Action issued in corresponding European Patent Application No. 12150226.4, mailed Jan. 23, 2013.
Summons to Attend Oral Proceedings issued in corresponding European Patent Application No. 12150226.4, mailed Jun. 19, 2013, 7 pages.
Chinese Patent No. 102063320, issued on Aug. 28, 2013, granted in corresponding Chinese Patent Application No. 201110002180.3, 19 pages.

\* cited by examiner

METHOD FOR SWITCHING WORKING MODE, USB DEVICE, AND HOST DEVICE

CROSS-REFERENCE TO RELATED APPLICATION

This application claims priority to Chinese Patent Application No. 201110002180.3, filed on Jan. 6, 2011, which is hereby incorporated by reference in its entirety.

FIELD OF THE INVENTION

The present invention relates to the communication field, and more particularly, to a method for switching working mode, a USB device, and a host device.

BACKGROUND OF THE INVENTION

USB devices are widely used because it is portable and supports plug-and-play. Currently, USB devices mainly includes two working modes: For some USB devices, such as a USB CDROM and a USB mouse, their drivers are already integrated in the operating system, so they may realize plug-and-play; for other USB devices, such as USB network adapters, their drivers should be installed before these USB devices may be used.

Assume that a USB device has both the preceding working modes, for example, the USB device has two working modes, namely, a USB CDROM mode and a USB network adapter mode, and that the default working mode of the USB device is the USB CDROM mode. To enable a user to use the USB network adapter mode, the USB device should judge the capability of a computer (PC for short) which is connected to the USB device to decide whether the USB device may work in the USB network adapter mode. In the prior art, an auxiliary program or an additional driver is used to enable the USB device to know whether the USB device may work in the USB network adapter mode. Specifically, for a solution in which an auxiliary program is used in the prior art, when a user runs a USB network adapter driver provided by an equipment maker on a PC, an auxiliary program should be run on the PC at the same time. At run time, the auxiliary program shakes hands with the USB device to inform the USB device that the USB network adapter driver has been installed on the PC so that the USB device may work in the USB network adapter mode. If there is no handshake information, the USB device works in the USB CDROM mode. For a solution where an additional driver s is used in the prior art, when a user runs a USB network adapter driver provided by an equipment maker on a PC, an additional driver, such as different kinds of filter drivers, should be run on the PC at the same time. When a USB device is being used, the PC first attempts to load the filter driver. The filter driver may shake hands with the USB device to inform the USB device that the USB network adapter driver have been installed on the PC so that the USB device may work in the USB network adapter mode.

For the preceding solutions in the prior art, a special auxiliary program or an additional driver should be developed, so the solutions are complicate; in addition, a risk of incompatibility may exist.

SUMMARY OF THE INVENTION

The embodiments of the present invention provide a method for switching a working mode, a USB device, and a host device.

An embodiment of the present invention provides a method for switching a working mode, including:

determining, according to an osvc key value in the registry of a host device, that a driver for a second working mode is installed on the host device, after being connected to the host device; and switching the current working state of the USB device from a first working mode to the second working mode.

An embodiment of the present invention provides another method for switching a working mode, including:

installing a driver for a second working mode of a USB device; and changing an osvc key value corresponding to the USB device in the registry, so that after the USB device is connected to a host device, the USB device may determine, according to the changed osvc key value, that the driver for the second working mode is installed on the host device.

An embodiment of the present invention provides a USB device, including:

a determining module, configured to determine, according to an osvc key value in the registry of a host device, that a driver for a second working mode is installed on the host device, after the USB device is connected to the host device; and a switching module, configured to switch the current working state of the USB device from a first working mode to the second working mode.

An embodiment of the present invention provides a host device, including:

an installation module, configured to install a driver for a second working mode of a USB device; and a changing module, configured to change an osvc key value corresponding to the USB device in the registry, so that after the USB device is connected to the host device, the USB device may determine, according to the changed osvc key value, that the driver for the second working mode is installed on the host device.

In the embodiments of the present invention, after installing the driver for the second working mode, the host device may change the osvc key value in the registry. Thereby, the changed osvc key value may be used as a basis for the USB device to judge whether the driver for the second working mode is installed on the host device, so that the USB device may switch the working state according to the changed osvc key value. In the embodiments of the present invention, neither special auxiliary program nor additional driver needs to be developed. Therefore, the solution is easy to implement and a problem of incompatibility will not occur.

BRIEF DESCRIPTION OF THE DRAWINGS

To describe the embodiments of the present invention or the technical solutions in the prior art more clearly, the following introduces briefly the accompanying drawings needed for illustrating such embodiments or technical solutions. Apparently, the accompanying drawings described briefly below are some embodiments of the present invention, and those skilled in the art may derive other drawings from these accompanying drawings without creative efforts.

DETAILED DESCRIPTION OF THE EMBODIMENTS

To clarify the objectives, technical solutions, and advantages of the embodiments of the present invention, the following describes the technical solutions of the embodiments of the present invention clearly and completely with reference to the accompanying drawings in the embodiments of the present invention. Apparently, the embodiments described below are some rather than all embodiments of the present invention. Other embodiments derived by those skilled in the art based on the embodiments of the present invention without creative efforts shall fall within the protection scope of the present invention.

Figure 1:
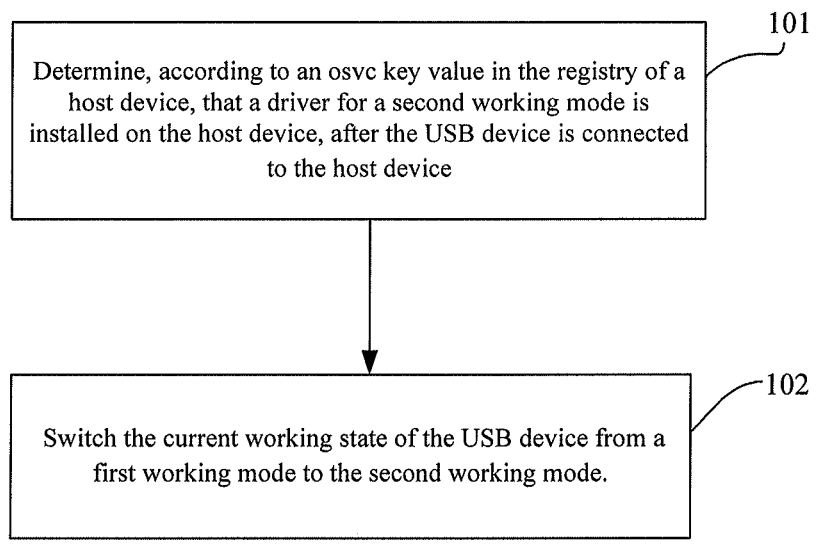
FIG. 1 is a flow chart of a first embodiment of a method for switching a working mode according to the present invention.

FIG. 1 is a flow chart of a first embodiment of a method for switching a working mode according to the present invention. As shown in FIG. 1, the method in the embodiment may include:

Step 101: Determine, according to an osvc key value in the registry of a host device, that a driver for a second working mode is installed on the host device, after the USB device is connected to the host device.

After being connected to a host device, for example, a PC, the USB device may determine, according to the osvc key value in the registry of the host device, whether the driver for the second working mode is installed on the host device.

In the embodiment, the second working mode refers to the working mode that may be used by the USB device only after the driver is installed on the host device, for example, a network adapter mode; a first working mode refers to a working mode that may be directly used by the USB device because a driver is integrated in the operating system and does not need to be reinstalled, for example, a CDROM mode.

Specifically, after the USB device is connected to the host device for the first time, the host device may query the registry and know that the osvc key value corresponding to the USB device is null, and then the host device may send a query command which is supported by a Microsoft Operation System (Microsoft Operation System, MSOS for short) to the USB device. The query command which is supported by the MSOS is used to query the compatibility flag of the USB device when the USB device is connected to the host device for the first time so as to determine whether the USB device supports the MSOS. In response to the query command which is supported by the MSOS, the USB device may send a support response command to the host device. The support response command may includes flag information indicating that the USB device supports the MSOS and flag information indicating that the USB device works in the first working mode by default.

For example, after the USB device is connected to the host device for the first time, the host device may query the USB device for a character string descriptor with an index (index for short) 0xEE. If the USB device supports the MSOS, it may return a character string to the host device. The character string may include bytes such as "FE", where "FE" indicates that the USB device works in the first working mode by default, for example, the CDROM mode. Then, the host device may write "FE" into the osvc key value in the registry of the host device. The location of the registry is HKLM\System\CurrentControlSet\Control\UsbFlags\VVVVPPPPXXXX, where VVVV is the vendor ID (vendor ID, VID for short), PPPP is the product ID (Product ID, PID for short) of the device, and XXXX is the version of the device. For example, in 12D118120000, "12D1" is the VID, "1812" is the PID, and "0000" is the version of the device.

The osvc key value is a 2-byte data of a BINARY type. The first byte indicates whether an MSOS descriptor is supported, and the second byte is a command code of the MSOS descriptor. After the host device receives a character string including "FE", the byte "01" indicating that the USB supports the MSOS may be written into the first byte of the osvc key value, and "FE" may be written into the second byte of the osvc key value.

If a user requires that the USB device work in the second working mode in which the driver should be installed, for example, the network adapter mode, the driver for the second working mode may be installed on the host device. After the installation of the driver for the second working mode is completed, the host device may change the osvc key value, for example, change the preceding "01FE". The changed osvc key value may enable the USB device to know that the host device supports the second working mode. It should be noted that the embodiment does not limit specific implementation where the host device changes the osvc key value after the driver for the second working mode is installed, provided that the USB device can know that the host device supports the second working mode.

After the driver for the second working mode is installed and the osvc key value in the registry is changed on the host device, if the USB device is connected to the host device again, the USB device may know that, according to the changed osvc key value, the driver for the second working mode is installed on the host device.

Step 102: Switch the current working state of the USB device from the first working mode to the second working mode.

When the USB device knows that the host device may support the second working mode, the working state of the USB device may be switched from the first working mode to the second working mode, for example, from the default CDROM mode to the network adapter mode.

It should be noted that in the embodiment, the USB device may switch the working mode by itself; for example, after determining that the driver for the second working mode is installed on the host device, the USB device may restart to switch the working state. The USB device may also switch the working mode under the control of the host device; for example, the host device may simulate the process where the USB device is powered off and then powered on to control the switching of the working mode of the USB mode, so as to enable the USB device to switch the working state. More specific operations of the USB device may be implemented according to the prior art, which are not detailed here.

In the embodiment, after the host device completes the installation of the driver for the second working mode, the host device may change the osvc key value in the registry. Therefore, the changed osvc key value may be used as a basis for the USB device to judge whether the driver for the second working mode is installed on the host device, so that the USB device may switch the working state according to the changed osvc key value. In the embodiment, neither special auxiliary program nor additional driver needs to be developed. Therefore, the solution is easy to implement and a problem of incompatibility will not occur.

Figure 2:
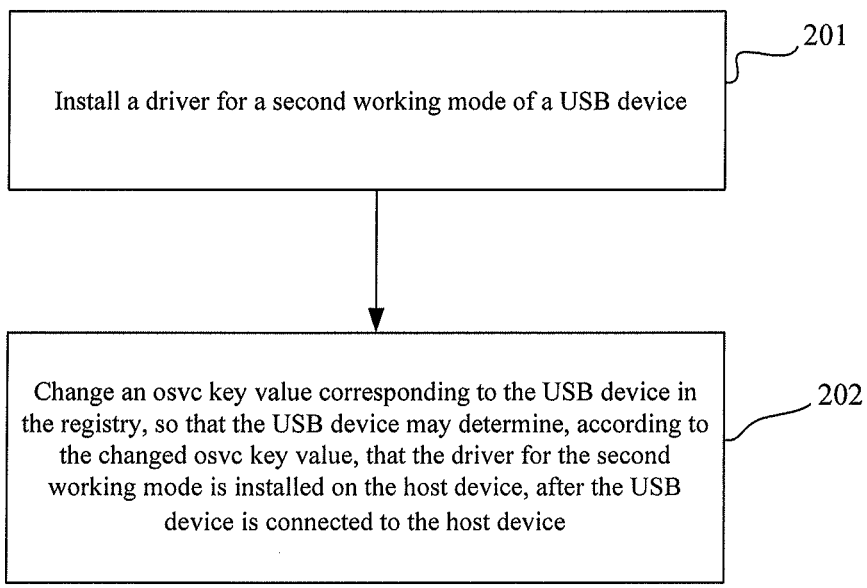
FIG. 2 is a flow chart of a second embodiment of a method for switching a working mode according to the present invention.

FIG. 2 is a flow chart of a second embodiment of a method for switching a working mode according to the present invention. As shown in FIG. 2, the method in this embodiment is a method implemented by the host device and corresponds to the method implemented by the USB device shown in FIG. 1. The method in this embodiment may include:

Step 201: Install a driver for a second working mode of a USB device.

If a user requires that the USB device work in the second working mode, the driver for the second working mode of the USB device may be installed on the host device. The process that the driver for the second working mode is installed on the host device may be implemented in the prior art, which is not detailed here.

Step 202: Change an osvc key value corresponding to the USB device in the registry, so that the USB device may determine, according to the changed osvc key value, that the driver for the second working mode is installed on the host device, after the USB device is connected to the host device.

After the installation of the driver for the second working mode is completed, the host device may change the osvc key value in the registry. The changed osvc key value may enable the USB device to know that the host device may support the second working mode.

Specifically, after the USB device is connected to the host device for the first time, the host device query the registry and know that the osvc key value corresponding to the USB device is null, and then the host device may send a query command which is supported by an MSOS to the USB device. In response to the query command which is supported by the MSOS, the USB device may send a support response command to the host device. The support response command may include flag information indicating that the USB device supports the MSOS and flag information indicating the default first working mode of the USB device. Then, the host device may write the flag information indicating that the USB device supports the MSOS and the flag information indicating the default first working mode of the USB device into the osvc key value. For example, after the USB device is connected to the host device for the first time, the osvc key value may be "01FE", where "01" is the flag information indicating that the USB device supports the MSOS and "FE" is the flag information indicating the default first working mode of the USB device.

After step 201 is completed, the host device may change the osvc key value, for example, the preceding "01FE". The changed osvc key value may enable the USB device to know that the host device supports the second working mode. After being connected to the host device again, the USB device may know, according to the changed osvc key value, that the driver for the second working mode is installed on the host device, and then switch the current working state from the default first working mode to the second working mode.

In this embodiment, after the installation of the driver for the second working mode is completed, the host device may change the osvc key value in the registry. Then, the changed osvc key value may be used as a basis for the USB device to judge whether the driver for the second working mode is installed on the host device, so that the USB device may switch the working state according to the changed osvc key value. In this embodiment, neither special auxiliary program nor additional driver should be developed. Therefore, the solution is easy to implement and a problem of incompatibility will not occur.

The preceding first and second embodiments do not limit which mode the host device specifically uses to change the osvc key value. Those skilled in the art may customize the mode as needed, provided that the USB device can know, according to the changed osvc key value, that the driver for the second working mode is installed on the host device, that is, provided that the USB device may switch the current working state from the default first working mode to the second working mode. In addition, in the first and second embodiments, the USB device may be any device with a USB connector, for example, a data card, which is not detailed here.

The following two embodiments describe in detail the technical solutions of the present invention. In both the following two embodiments, the case that the first working mode is a CDROM mode and the second working mode is a network adapter mode is used as an example. It should be noted that the following embodiments do not limit which specific working mode the first working mode or the second working mode is. Those skilled in the art may set the first working mode to the working mode in which the driver is integrated in the operating system and set the second working mode to the working mode in which a driver for the USB device is required to be installed.

Figure 3:
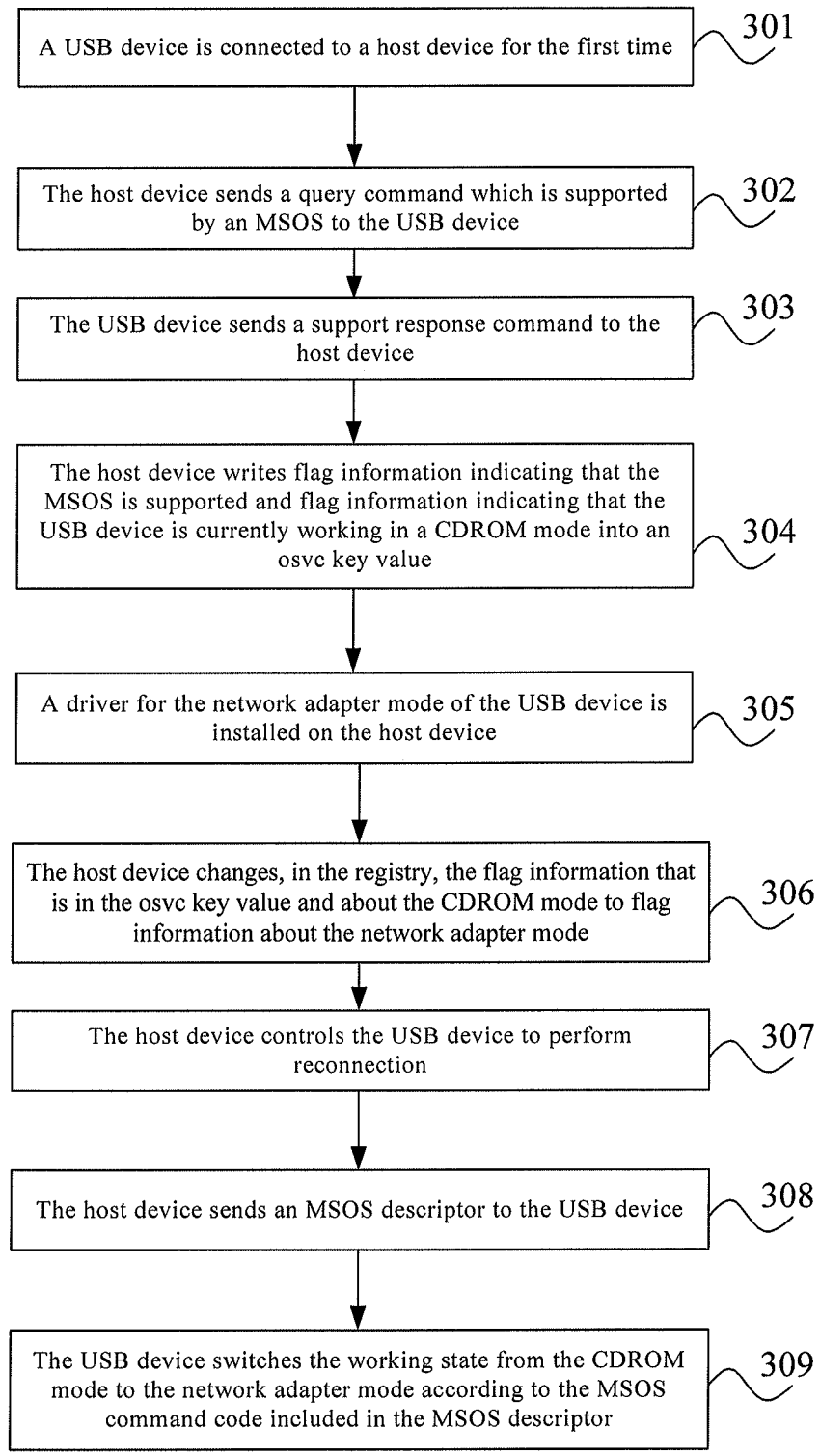
FIG. 3 is a flow chart of a third embodiment of a method for switching a working mode according to the present invention.

FIG. 3 is a flow chart of a third embodiment of a method for switching a working mode according to the present invention. As shown in FIG. 3, the method in the embodiment may include:

Step 301: A USB device is connected to a host device for the first time.

Step 302: The host device sends a query command which is supported by an MSOS to the USB device.

After the USB device is connected to the host device for the first time, the host device may query the registry and know that the osvc key value corresponding to the USB device is null, and then the host device may send the query command which is supported by the MSOS to the host device.

Step 303: The USB device sends a support response command to the host device.

The support response command includes flag information indicating that the MSOS is supported and flag information indicating that the USB device is currently working in a CDROM mode.

For example, the flag information indicating that the MSOS is supported may be "01", and the flag information indicating that the USB device is working in the CDROM mode may be "FE". Then the support response command may include "01FE".

Step 304: The host device writes the flag information indicating that the MSOS is supported and the flag information indicating that the USB device is currently working in the CDROM mode into the osvc key value.

After receiving the support response command, the host device may write the included "01FE" into the osvc key value.

Step 305: A driver for a network adapter mode of the USB device is installed on the host device.

Step 306: The host device changes, in the registry, the flag information that is in the osvc key value and about the CDROM mode to flag information about the network adapter mode.

After the driver for the network adapter mode is installed, the host device may change the osvc key value.

In this embodiment, for example, the host device may change "01FE" to "010F", where "0F" indicates that the host device may support the network adapter mode.

During the implementation, the host device may maintain corresponding relations between working modes and flag information. Table 1 shows a corresponding relation between working modes and flag information. In the table, BINARY1 is the first byte of the osvc key value, BINARY2 is the second byte of the osvc key value, and the configuration indicates the corresponding driver. If a driver corresponding to Configuration 2 is installed on the host device, the host device may change the osvc key value to "0101". Those skilled in the art may change the content and form of Table 1 as needed.

TABLE 1

| BINARY1 | 0x00 | 0x01 | 0x01 | 0x . . . | 0x00 |
|---|---|---|---|---|---|
| BINARY2 (MSOS command code) | 0xXX | 0x01 | 0x02 | 0x . . . | 0xFF |
| Configuration | Configuration 1 | Configuration 2 | Configuration 3 | Configuration . . . | Configuration N |

Step 307: The host device controls the USB device to perform reconnection.

To enable the host device to send the changed osvc key value to the USB device, the host device should control the USB device to be reconnected to the host device. For example, the host device may first remove the USB device and then control the USB device to connect the host device; thereby, the USB device is reconnected. Alternatively, in step 307, the USB device may automatically restart to realize the reconnection of the USB device.

Step 308: The host device sends an MSOS descriptor to the USB device.

After the USB device is reconnected to the host device, because the osvc key value is not null, the host device may send an MSOS descriptor to the USB device. The MSOS descriptor may be "C00F", where the MSOS command code "0F" is the second byte of the osvc key value, indicating that the host device supports the network adapter mode.

Step 309: The USB device switches the working state from the CDROM mode to the network adapter mode according to the MSOS command code included in the MSOS descriptor.

After receiving the MSOS descriptor, the USB device may know, according to the command code "0F" included in the MSOS descriptor, that the host device may support the network adapter mode. Therefore, the USB device may switch the current CDROM mode to the network adapter mode.

In this embodiment, after the installation of the driver for the network adapter mode is completed, the host device may change the second byte of the osvc key value in the registry to the flag of the network adapter mode. Then, the changed osvc key value may be used as a basis for the USB device to judge whether the driver for the network adapter mode is installed on the host device, so that the USB device may switch the working state according to the changed osvc key value. In this embodiment, neither special auxiliary program nor additional driver needs to be developed. Therefore, the solution is easy to implement and a problem of incompatibility will not occur.

Figure 4:
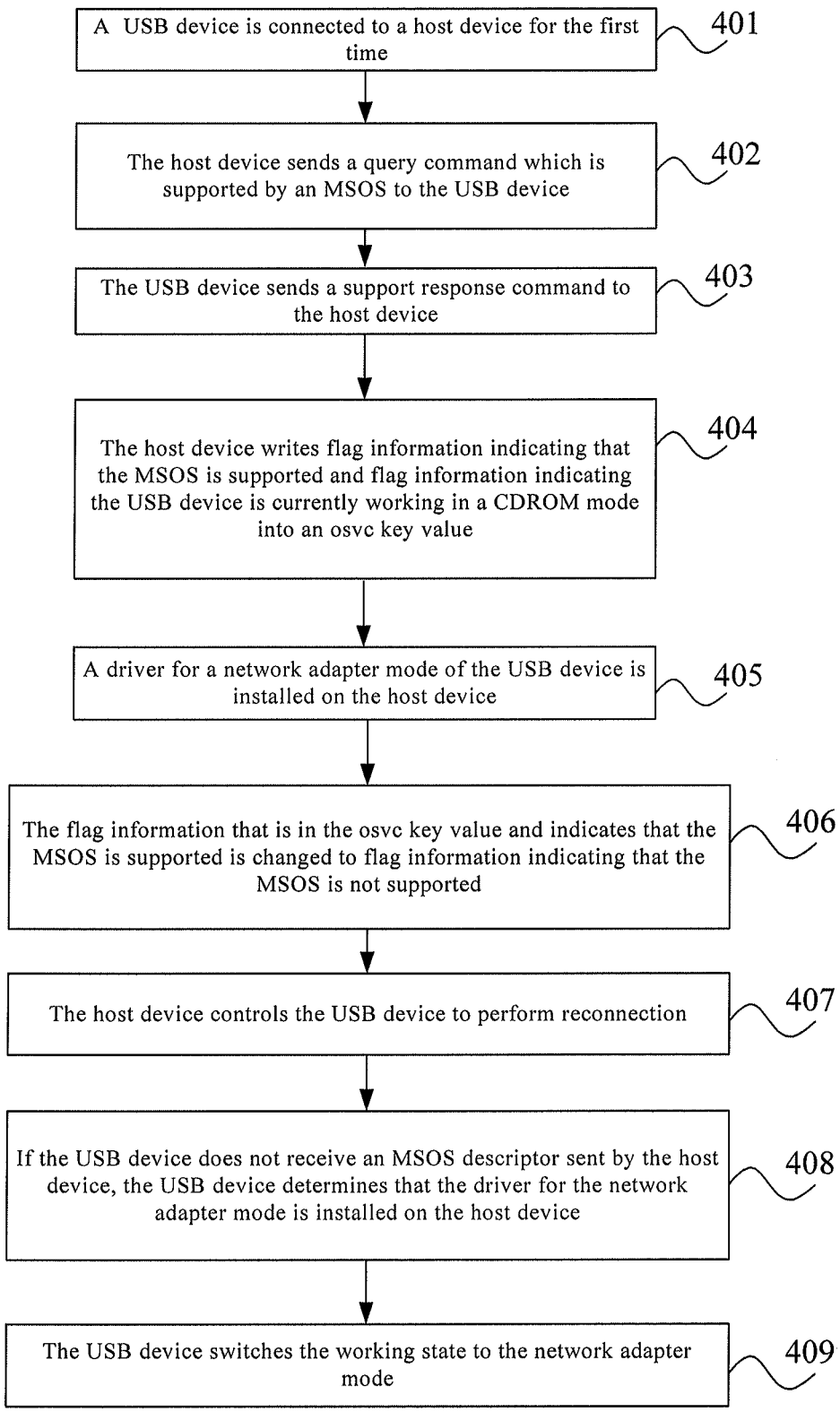
FIG. 4 is a flow chart of a fourth embodiment a method for switching a working mode according to of the present invention.

FIG. 4 is a flow chart of a fourth embodiment of a method for switching a working mode according to the present invention. As shown in FIG. 4, the method in the embodiment may include:

Step 401: A USB device is connected to a host device for the first time.

Step 402: The host device sends a query command which is supported by an MSOS to the USB device.

Step 403: The USB device sends a support response command to the host device.

Step 404: The host device writes flag information indicating that the MSOS is supported and flag information indicating the USB device is currently working in a CDROM mode into the osvc key value.

Step 405: A driver for a network adapter mode of the USB device is installed on the host device.

The implementation of the preceding steps 401 to 405 is the same as that of steps 301 to 305 shown in FIG. 3, which is not detailed here.

Step 406: The flag information that is in the osvc key value and indicates that the MSOS is supported is changed to flag information indicating that the MSOS is not supported.

This embodiment differs from the third embodiment in FIG. 3. In the third embodiment, the flag information indicating the CDROM mode in the second byte of the osvc is changed into the flag information about the network adapter mode, and the MSOS descriptor including the flag information about the network adapter mode is sent to the USB device, so as to clearly indicate the USB device may switch the working mode. In this embodiment, however, after the installation of the driver for the network adapter mode is completed, the host device changes the flag information that is in the osvc key value and indicates that the MSOS is supported to the flag information indicating that the MSOS is not supported. That is, the host device changes the first byte of the osvc key value; for example, the host device changes "01FE" to "00FE" or "0000", so that the changed osvc key value indicates that the USB device does not support the MSOS.

Step 407: The host device controls the USB device to perform reconnection.

To enable the host device to send the changed osvc key value to the USB device, the host device should control the USB device to be reconnected to the host device. For example, the host device may first remove the USB device and then control the USB device to be reconnected to the host device; thereby, the reconnection of the USB device is completed.

Step 408: If the USB device does not receive an MSOS descriptor sent by the host device, the USB device determine that the driver for the network adapter mode is installed on the host device.

After the USB device is reconnected to the host device, the osvc key value is not null, but the first byte of the osvc key value indicates that the USB device does not support the MSOS. Therefore, the host device does not send the MSOS descriptor to the USB device. Under normal conditions, when the USB device is connected to the host device not for the first time, the osvc key value is not null, so the host device should send the MSOS descriptor to the USB device. In this embodiment, however, after the driver for the network adapter mode is installed, the host device changes the first byte of the osvc key value to indicate that the USB does not support the MSOS. Therefore, the host device does not send the MSOS descriptor to the USB device, so as to implicitly indicate to the USB device that the driver for the network adapter mode is installed. Therefore, the USB device may determine that the driver for the network adapter mode is installed on the host device, if the USB device does not receive the MSOS descriptor, though the USB device should have received the MSOS descriptor.

Step 409: The USB device switches the working state to the network adapter mode.

If the USB device does not receive the MSOS descriptor, the USB device may switch from the current CDROM mode to the network adapter mode.

During the implementation, the USB device may set a threshold. If the waiting time exceeds the threshold, the USB device determines the MSOS descriptor is not received and thereby determines that the driver for the network adapter mode is installed on the host device; in this case, the USB device may switch from the current CDROM mode to the network adapter mode.

In this embodiment, after the installation of the driver for the network adapter mode is completed, the host device may change the first byte of the osvc key value in the registry to the flag information indicating that the MSOS is not supported, so that the USB device may not receive the MSOS descriptor sent by the host device, and thereby the USB device may switch the current working state from the CDROM mode to the network adapter mode. In this embodiment, neither special auxiliary program nor additional driver needs to be developed. Therefore, the solution is easy to implement and a problem of incompatibility will not occur.

Figure 5:
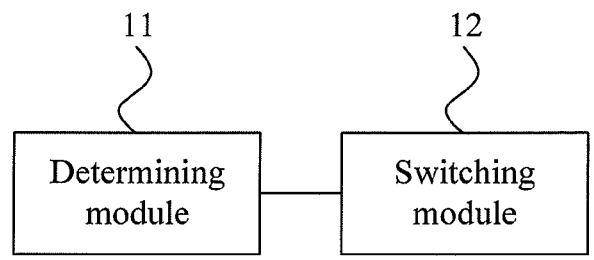
FIG. 5 is a schematic structural diagram of a first embodiment of a USB device according to the present invention.

FIG. 5 is a schematic structural diagram of a first embodiment of a USB device according to the present invention. As shown in FIG. 5, the USB device in this embodiment may include: a determining module 11 and a switching module 12. The determining module 11 is configured to determine, according to an osvc key value in the registry of a host device, that a driver for the second working mode is installed on the host device, after the USB device is connected to the host device. The switching module 12 is configured to switch the current working state of the USB device from a first working mode to a second working mode.

The USB device in this embodiment may be used to implement the method in the method embodiment shown in FIG. 1. The implementation principles and technical effects are similar, which are not detailed here.

Figure 6:
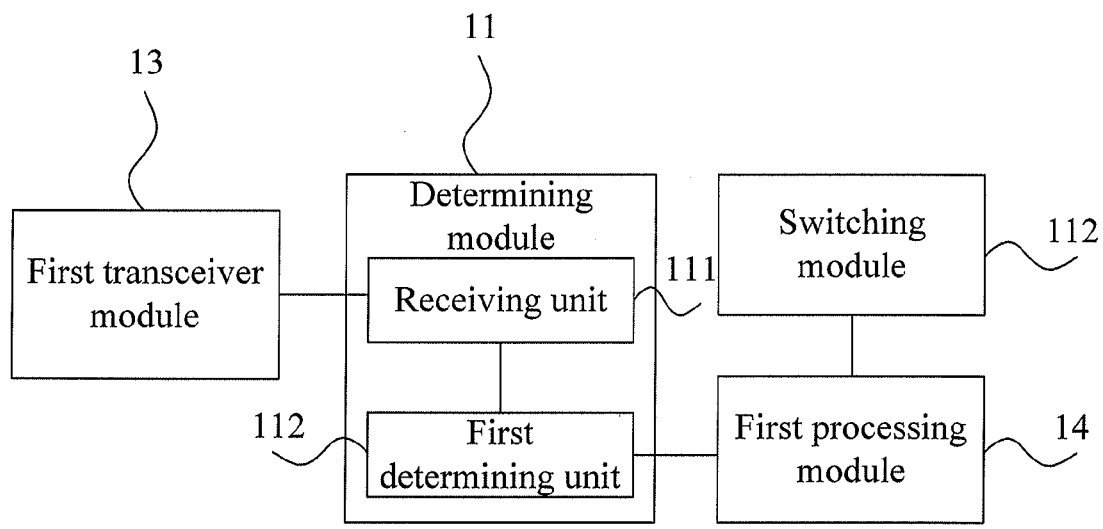
FIG. 6 is a schematic structural diagram of a second embodiment of a USB device according to the present invention.

FIG. 6 is a schematic structural diagram of a second embodiment of a USB device according to the present invention. As shown in FIG. 6, based on the structure of the USB device shown in FIG. 5, the USB device in this embodiment further includes a first transceiver module 13 and a first processing module 14; and the determining module 11 may include a receiving unit 111 and a first determining unit 112. The first transceiver module 13 is configured to receive a query command which is supported by an MSOS and sent by the host device and to send a support response command to the host device, where the support response command includes flag information indicating that the MSOS is supported and flag information indicating that the USB device is currently working in a first working mode. The first processing module 14 is configured to be reconnected to the host device after the host device has the driver for a second working mode installed and changes the osvc key value. The reception unit 111 is configured to receive the MSOS descriptor from the host device, where the MSOS command code in the MSOS descriptor is flag information that is in the osvc key value and indicates that the driver for the second working mode is installed on the host device. The first determining unit 112 is configured to determine, according to the flag information about the driver for the second working mode, that the driver for the second working mode is installed on the host device.

The USB device in this embodiment may be used to implement the method in the method embodiment shown in FIG. 3. The implementation principles and technical effects are similar, which are not detailed here.

Figure 7:
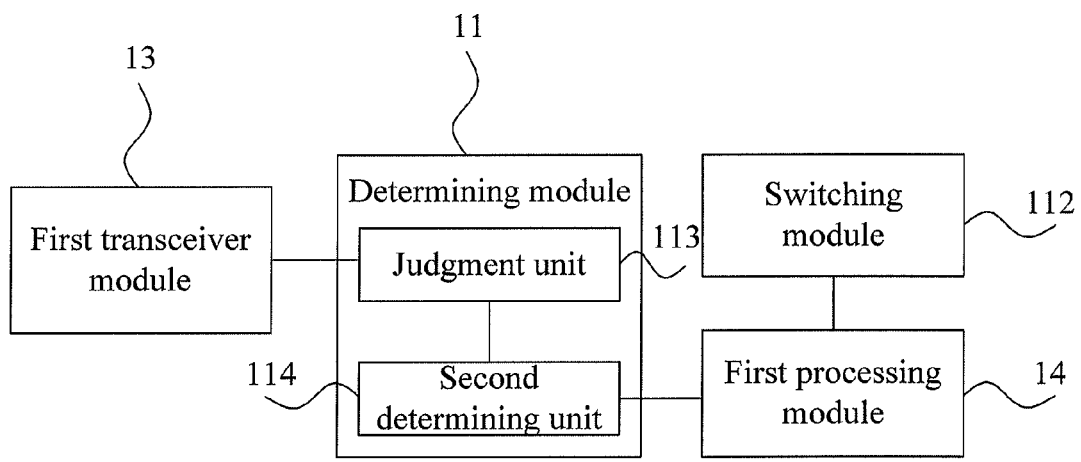
FIG. 7 is a schematic structural diagram of a third embodiment of a USB device according to the present invention.

FIG. 7 is a schematic structural diagram of a third embodiment of a USB device according to the present invention. As shown in FIG. 7, based on the structure of the USB device shown in FIG. 5, the USB device in this embodiment further includes: a first transceiver module 13 and a first processing module 14; the determining module 11 may include a judgment unit 113 and a second determining unit 114. The first transceiver module 13 is configured to receive a query command which is supported by the MSOS and sent by the host device and to send a support response command to the host device, where the support response command includes the flag information indicating that the MSOS is supported and the flag information indicating that the USB device is currently working in a first working mode. The first processing module 14 is configured to be reconnected to the host device after the host device has the driver for the second working mode installed and changes the osvc key value. The judgment unit 113 is configured to judge whether an MSOS descriptor sent by the host device is received. The second determining unit 114 is configured to determine that the driver for the second working mode is installed on the host device if the judgment unit judges that no MSOS descriptor sent by the host device is received.

The USB device in this embodiment may be used to implement the method in the method embodiment shown in FIG. 4. The implementation principles and technical effects are similar, which are not detailed here.

Figure 8:
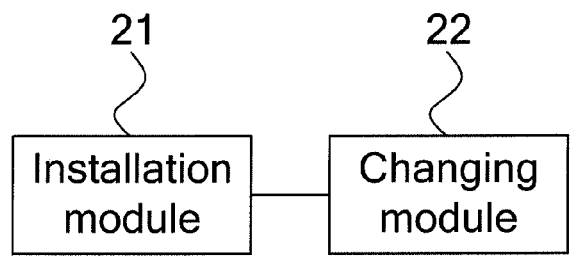
FIG. 8 is a schematic structural diagram of a first embodiment of a host device according to the present invention.

FIG. 8 is a schematic structural diagram of a first embodiment of a host device according to the present invention. As shown in FIG. 8, the host device in this embodiment may include an installation module 21 and a changing module 22. The installation module 21 is configured to install a driver for a second working mode of a USB device. The changing module 22 is configured to change the osvc key value corresponding to the USB device in the registry, so that the USB device determines, according to the changed osvc key value, that the driver for the second working mode is installed on the host device, after the USB device is connected to the host device.

The host device in this embodiment may be used to implement the method in the method embodiment shown in FIG. 2. The implementation principles and technical effects are similar, which are not detailed here.

Figure 9:
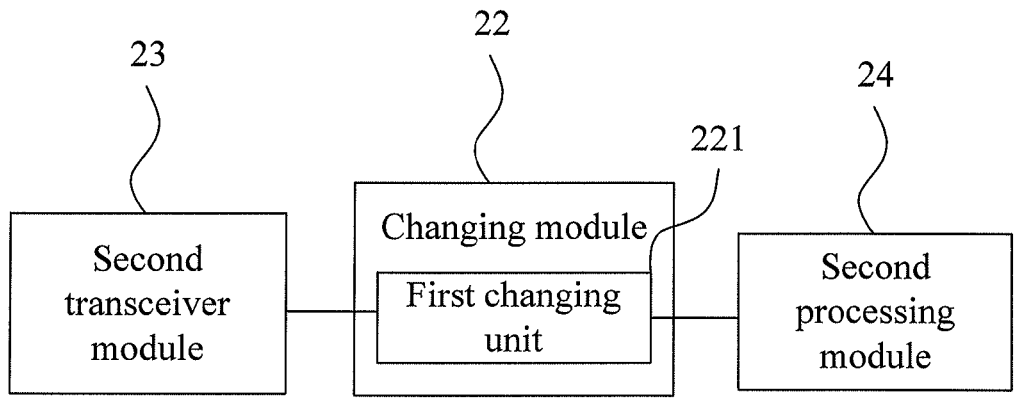
FIG. 9 is a schematic structural diagram of a second embodiment of a host device according to the present invention.

FIG. 9 is a schematic structural diagram of a second embodiment of a host device according to the present invention. As shown in FIG. 9, based on the structure of the host device shown in FIG. 8, the host device in this embodiment further includes a second transceiver module 23 and a second processing module 24; the changing module 22 further includes a first changing unit 221. The second transceiver module 23 is configured to send a query command which is supported by an MSOS to the USB device, and to receive a support response command sent by the USB device, where the support response command includes flag information indicating that the MSOS is supported and flag information indicating that the USB device is currently working in a first working mode. The second processing module 24 is configured to write the flag information indicating that the MSOS is supported and the flag information indicating that the USB device is currently working in the first working mode into the osvc key value, and to control the USB device to perform reconnection after the osvc key value corresponding to the USB device is changed. The first changing unit 221 is configured to change the flag information that is in the osvc key value and about the first working mode to the flag information about a second working mode, and to send an MSOS descriptor to the USB device, where the MSOS command code in the MSOS descriptor is a flag information that is in the osvc key value and indicates that the driver for the second working mode is installed on the host device.

The host device in this embodiment may be used to implement the method in the embodiment shown in FIG. 3. The implementation principles and technical effects are similar, so which are not detailed here.

Figure 10:
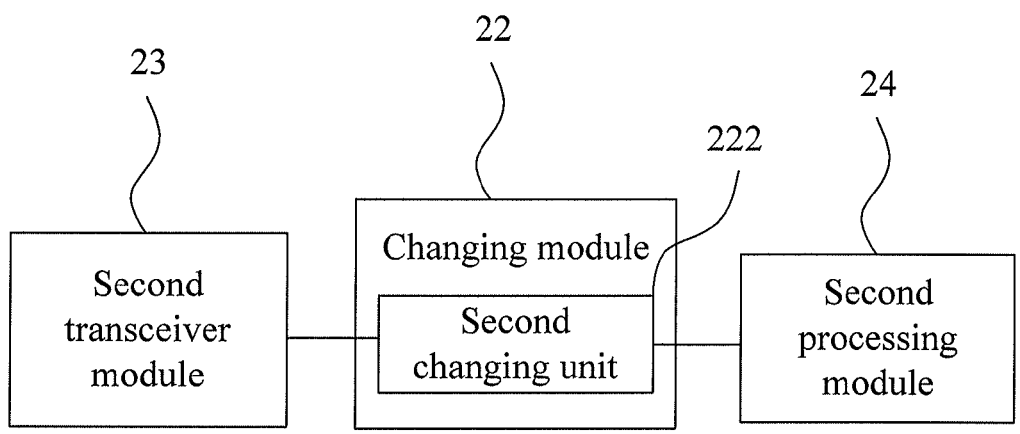
FIG. 10 is a schematic structural diagram of a third embodiment of a host device according to the present invention.

FIG. 10 is a schematic structural diagram of a third embodiment of a host device according to the present invention. As shown in FIG. 10, based on the structure of the host device shown in FIG. 8, the host device in this embodiment further includes a second transceiver module 23 and a second processing module 24; a changing module 22 further includes a second changing unit 222. The second transceiver module 23 is configured to send a query command which is supported by the MSOS to the USB device and receive a support response command sent by the USB device, where the support response command includes flag information indicating that the MSOS is supported and flag information indicating that the USB device is currently working in a first working mode. The second processing module 24 is configured to write the flag information indicating that the MSOS is supported and the flag information indicating that the USB device is currently working in the first working mode into the osvc key value, and to control the USB device to perform reconnection after the changing module changes the osvc key value corresponding to the USB device in the registry. The second changing unit 222 is configured to change the flag information that is in the osvc key value and indicates that the MSOS is supported to the flag information indicating that the MSOS is not supported.

The host device in this embodiment may be used to implement the method in the embodiment shown in FIG. 4. The implementation principles and technical effects are similar, which are not detailed here.

It may be understood by those skilled in the art that, all or some steps in the preceding method embodiments may be implemented by a program instructing related hardware; the program may be stored in a readable storage medium, where in execution, the program executes the steps including those in the preceding method embodiments; the preceding storage medium includes different kinds of media such as an ROM/RAM, a disk, or an optical disk that may store program codes.

It should be noted that the preceding embodiments are used to illustrate rather than to limit the technical solutions in the present invention. Although the present invention is described in detail with reference to the preceding embodiments, it should be understood by those skilled in the art that modifications may still be made to the technical solutions disclosed in the preceding embodiments, or equivalent replacements may be made to some technical features. Such modifications and replacements do not make the essence of the corresponding technical solutions departed from the spirit and scope of the technical solutions in the embodiments of the present invention.

What is claimed is:

1. A method executed by a Universal Serial Bus (USB) device, the USB device operable to connect with a computer host via a USB interface and work with the computer host in a first working mode and a second working mode, the method comprising:
   starting the first working mode after being connected with the host computer via the USB interface;
   receiving, from the computer host, an operating system descriptor including a value obtained from an osvc key in a registry of the computer host;
   determining, according to the value, that a driver for the USB device's second working mode is installed on the computer host; and
   based upon the determination, switching, from the first working mode to the second working mode.

2. The method according to claim 1, wherein the first working mode is a CDROM mode, and the second working mode is a network adapter mode.

3. A Universal Serial Bus (USB) device operable to connect with a computer host via a USB interface and work with the computer host in a first working mode and a second working mode, the USB device comprising:
   memory including program instructions stored thereon;
   a USB interface; and
   one or more processors configured to execute the program instructions to:
   receive via the USB interface, from the computer host, an operating system descriptor including a value obtained from an osvc key value in a registry of the computer host;
   determine, according to the value, that a driver for the USB device's second working mode is installed on the computer host; and
   based upon the determination, switch, from the first working mode to the second working mode.

4. A computer readable non-transitory storage medium storing one or more programs, the one or more programs comprising instructions, which when executed by a Universal Serial Bus (USB) device with a USB interface, cause the portable electronic device to perform a method comprising:
   starting a first working mode after being connected with the host computer via the USB interface;
   receiving, from the computer host, an operating system descriptor including a value obtained from an osvc key in a registry of the computer host;
   determining, according to the value, that a driver for the USB device's second working mode is installed on the computer host; and
   based upon the determination, switching, from the first working mode to the second working mode.

* * * * *